(12) United States Patent
Benzel et al.

(10) Patent No.: US 6,840,111 B2
(45) Date of Patent: Jan. 11, 2005

(54) MICROMECHANICAL COMPONENT AND PRESSURE SENSOR HAVING A COMPONENT OF THIS TYPE

(75) Inventors: Hubert Benzel, Pliezhausen (DE); Heribert Weber, Nuertingen (DE); Frank Schaefer, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/433,541

(22) PCT Filed: Sep. 29, 2002

(86) PCT No.: PCT/DE02/03543

§ 371 (c)(1),
(2), (4) Date: Nov. 20, 2003

(87) PCT Pub. No.: WO03/031926

PCT Pub. Date: Apr. 17, 2003

(65) Prior Publication Data

US 2004/0089073 A1 May 13, 2004

(30) Foreign Application Priority Data

Oct. 4, 2001 (DE) .......................... 101 48 859

(51) Int. Cl.$^7$ .............................. G01L 9/00; G01L 7/06
(52) U.S. Cl. ......................................... 73/729.1; 73/717
(58) Field of Search ................................ 257/414–415; 73/715–727, 728–756

(56) References Cited

FOREIGN PATENT DOCUMENTS

| DE | 25 44 506 | 5/1976 |
|----|-----------|--------|
| DE | 39 32 618 | 4/1991 |
| EP | 0 427 261 | 8/1995 |
| EP | 0 793 082 | 9/1997 |
| JP | 61 088121 | 5/1986 |
| WO | WO 97 39320 | 10/1997 |

*Primary Examiner*—William Oen
(74) *Attorney, Agent, or Firm*—Kenyon & Kenyon (57) ABSTRACT

A micromechanical component in which lateral deformations, i.e., deformations of the component parallel to its two main surfaces, are concentrated in a defined area of the component structure, making it possible to decouple lateral and vertical stresses in the component. The component structure includes at least one bellows-like structure in which lateral deformations of the component are concentrated. A pressure sensor having a micromechanical component of this type may be used, for example, for measured-value detection.

17 Claims, 6 Drawing Sheets

MICROMECHANICAL COMPONENT AND PRESSURE SENSOR HAVING A COMPONENT OF THIS TYPE

FIELD OF THE INVENTION

The present invention relates to a micromechanical component for mounting on a carrier as well as a pressure sensor comprising a component of this type, the pressure sensor including a diaphragm and the component at least being partially located on the diaphragm.

BACKGROUND INFORMATION

PCT Application No. WO 9739320 describes a pressure sensor having a steel diaphragm onto which is mounted a micromechanical component in the form of a silicon bridge. Piezoresistive measuring elements that are integrated into the silicon bridge are used to detect the diaphragm deflections.

In practice, the sensor concept described in WO 9739320 has proven to be problematic because the micromechanical component and steel diaphragm have different coefficients of thermal expansion. Because the sensor is ordinarily exposed to temperature fluctuations, lateral mechanical stresses that can significantly distort the sensor measurement results occur in the silicon bridge. To prevent this, WO 9739320 proposes a complex mounting concept that is intended to absorb the lateral mechanical stresses.

SUMMARY

In accordance with an example embodiment of the present invention, a micromechanical component is provided in which lateral deformations, i.e., deformations of the component parallel to its two main surfaces, are concentrated in a defined area of the component structure, which makes it possible to decouple lateral and vertical stresses in the component.

This is achieved according to the present invention by providing the component structure with at least one bellows-like structure in which lateral deformations of the component are concentrated.

According to the present invention, it has been recognized that bellows-like structures, including those in micromechanical components, are easy to produce and, if oriented in the direction of movement, are able to efficiently absorb deformations. Bellows-like structures may thus be advantageously used to compensate for thermally induced and mounting-related deformations.

A micromechanical component according to the present invention and, in particular, its bellows-like structure, may in principle be implemented in a number of different ways.

In a first advantageous embodiment, the bellows-like structure includes at least one thinned section that extends largely across the entire thickness of the component structure and is therefore perpendicular to the two main surfaces of the component. This thinned section is provided between two largely parallel notches in the component structure, one notch extending away from one main surface of the component and the other notch extending away from the other main surface of the component. The thinned section easily yields to lateral deformations of the component, while it is able to efficiently transfer vertical deformations, i.e., deformations that are perpendicular to the two main surfaces of the component, to the component structure.

In a second advantageous embodiment, the bellows-like structure includes at least one undulated web that extends largely across the entire thickness of the component structure and interconnects two areas of the component structure. The longer the undulated web, or the more loops it has, the better it is able to absorb lateral deformations. Vertical deformations in this case are also largely transferred to the component structure, since the web extends across the entire thickness of the component structure.

The component structure according to the present invention may be easily implemented in silicon, i.e., using standard microsystem techniques. Thus, the bellows-like structure of the first embodiment described above may be produced, for example, by both sawing and anisotropic etching, for example, plasma etching, trench etching or KOH etching, a more accurate position and depth of the structures being achievable using anisotropic etching techniques. The bellows-like structure of the second embodiment described above may be easily produced by sawing. Anisotropic etching techniques are mainly used for this purpose.

The present invention also proposes a pressure sensor having a micromechanical component according to the present invention. The pressure sensor includes a diaphragm on which the component is at least partially located. In addition to the bellows-like structure, in which lateral deformations of the component are concentrated, the component in this case also includes means for detecting deformations that are caused by deflections of the diaphragm, i.e., means for detecting vertical deformations in the component. Because the lateral and vertical stresses are decoupled in the component according to the present invention, thermally produced deformations of the component relative to the diaphragm do not affect the pressure measurement results.

In an advantageous embodiment of the pressure sensor according to the present invention, the component structure includes at least one deformation area in which vertical deformations of the component, i.e., mainly the deformations caused by diaphragm deflections, are concentrated. The design of a deformation area of this type supports the decoupling of lateral and vertical stresses in the component. The deformation area is designed to be thinner than the other parts of the component structure and may therefore be implemented, for example, in the form of a web in the component structure that is oriented largely parallel to the two main surfaces of the component.

In the case of the component used in connection with the pressure sensor according to the present invention, the deformation area is also integratable into the bellows-like structure. One example of a bellows-like structure of this type has at least one undulated web that extends largely across the entire thickness of the component structure and interconnects two areas of the component structure. The central area of the undulated web extending along the entire length of the web acts neutrally toward lateral deformations of the component, but represents the point of maximum stress in the case of vertical deformations of the component so that this central area forms a deformation area in the manner described above.

Because the vertical deformations of the component are concentrated in the deformation area, it has been proven to be advantageous if the means for detecting the deformations include at least one piezoelectric resistor, metallic resistor or wire resistance strain gauge that is located in the deformation area. This resistor is advantageously connectable to reference resistors in a Wheatstone bridge.

In addition to having a bellows-like structure that absorbs the lateral deformations of the component and a deformation area where vertical deformations are concentrated, the component structure of the component of a pressure sensor according to the present invention may also include areas where no deformations at all occur. At least some parts of an evaluation circuit may be advantageously located in these reinforced areas of the component structure.

In one example embodiment of the pressure sensor according to the present invention, the component is implemented in the form of a bridge that is mounted on the diaphragm via a first junction point in the central area of the diaphragm and via a second junction point in the area of the diaphragm edge. The bellows-like structure and the deformation area are located between the two junction points. If the deformation area is not integrated into the bellows-like structure, the bellows-like structure is advantageously located in the area of the diaphragm, while the deformation area is located in the vicinity of the second junction point. In this case, a reinforced central area, on which, for example, part of the evaluation circuit is locatable, may be provided between the bellows-like structure and the deformation area. In this regard, note that both a resistor located in the deformation area and parts of the evaluation circuit are integratable into the micromechanical component, provided the component is implemented in a suitable substrate, such as a silicon substrate.

As explained in detail above, the subject matter of the present invention may be advantageously improved and refined in a number of different ways. To this end, a number of exemplary embodiments of the present invention are explained below.

BRIEF DESCRIPTION OF THE DRAWINGS

FIG. 3a shows a second example embodiment of a micromechanical component according to the present invention, viewed from above.

FIG. 3b shows a sectional view of a pressure sensor having the micromechanical component illustrated in FIG. 3a.

FIG. 6b shows a sectional view of the component illustrated in FIG. 6a.

DETAILED DESCRIPTION

Figure 1A:
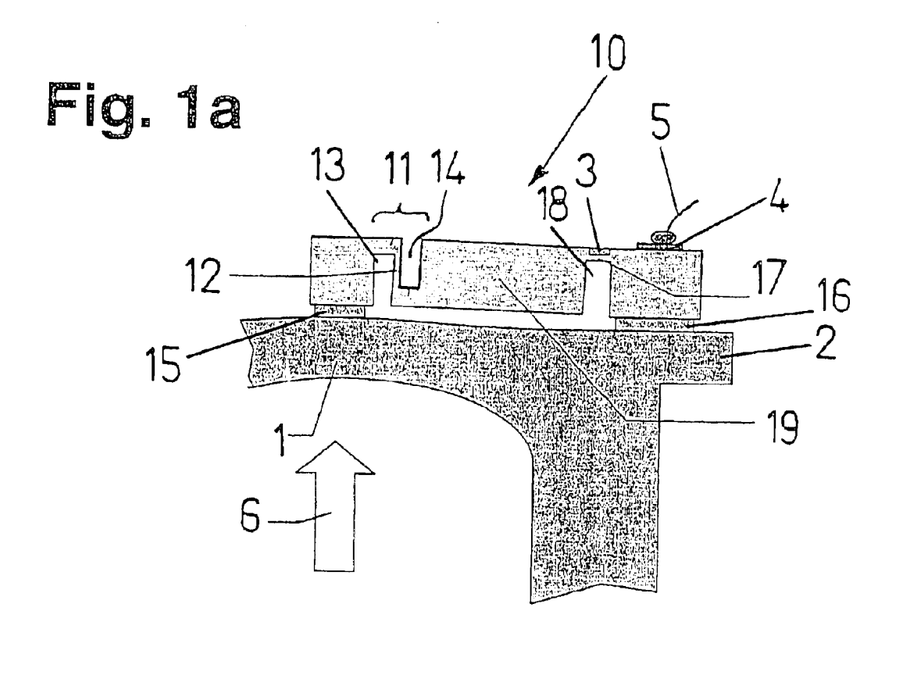
FIG. 1a shows a sectional view of a pressure sensor having a first example embodiment of a micromechanical component according to the present invention to which pressure has been applied.
Figure 1B:
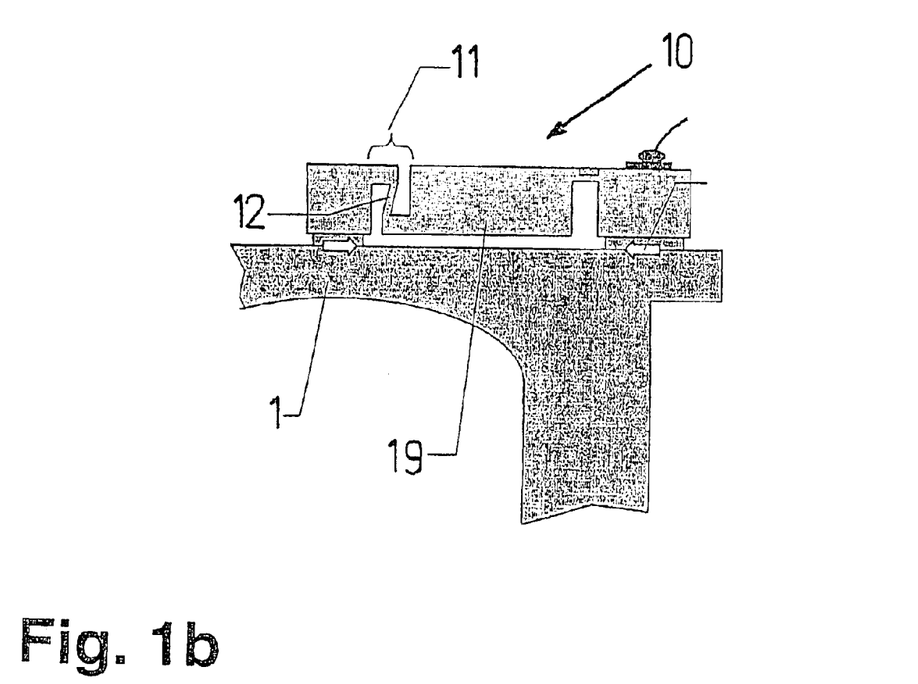
FIG. 1b shows a sectional view of the pressure sensor illustrated in FIG. 1a under thermally induced mechanical stresses.

FIGS. 1a and 1b show a pressure sensor, i.e., part of diaphragm 1 of a pressure sensor. In this case, diaphragm 1 having diaphragm edge 2 is made of steel. On it is mounted a micromechanical component 10 that, in the exemplary embodiment illustrated here, is made of silicon. According to the present invention, the component structure of this component 10 includes a bellows-like structure 11 that is designed so that lateral deformations of component 10 are concentrated therein. Such deformations, located parallel to the two main surfaces of component 10 and to diaphragm 1, occur, for example in the presence of temperature fluctuations, when the materials of micromechanical component 10 and diaphragm 1 have different coefficients of thermal expansion.

Bellows-like structure 11 in this case includes a thinned section 12 that is oriented perpendicular to the two main surfaces of component 10 and extends largely across the entire thickness of the component structure and is provided between two parallel notches 13 and 14 in the component structure. Notch 13 extends away from the main surface of component 10 facing diaphragm 1, while notch 14 extends away from the other main surface of component 10 facing away from diaphragm 1.

Lateral deformations of component 10, in particular thermally induced mechanical stresses, are absorbed by bellows-like structure 11 and result in a deformation of the thinned section 12, as shown in FIG. 1b. Conversely, vertical deformations of component 10, in particular mechanical stress caused by a compressive load on diaphragm 1, are efficiently transferred, as explained in greater detail below.

In this case, micromechanical component 10 is implemented in this case in the form of a bridge. It is connected to diaphragm 1, and diaphragm edge 2, respectively, only via a first junction point 15 in the central area of diaphragm 1 and via a second junction point 16 in the area of diaphragm edge 2.

In the exemplary embodiment illustrated here, the component structure contains a deformation area 17 in which vertical deformations of component 10 are concentrated, i.e., deformations that are oriented perpendicular to the two main surfaces of component 10 and are caused, for example, by a deflection of diaphragm 1. Deformation area 17, in this case, is implemented in the form of a web that is produced by a third notch 18 in the component structure. This notch 18 extends away from the main surface of component 10 that faces diaphragm 1, and it is deeper than notches 13 and 14 in bellows-like structure 11 so that web 17 is thinner than the other parts of the component structure. At least one piezoelectric resistor 3 that is used to detect the deformations of the component structure concentrated in web 17 is integrated into web 17.

Both bellows-like structure 11 and deformation area 17 are located between the two junction points 15 and 16. Bellows-like structure 11 is located next to first junction point 15 in the area of diaphragm 1, while deformation area 17 is positioned next to second junction point 16 in the area of diaphragm edge 2. A reinforced central area 19, which transfers the mechanical stresses in the presence of a compressive load on diaphragm 1 to piezoelectric resistor 3 in deformation area 17 and thermally induced stresses to thinned section 12 of the bellows-like structure, is provided between bellows-like structure 11 and deformation area 17. Because central area 19 does not, in principle, undergo any deformation, at least some parts of an evaluation circuit may be positioned here and, if necessary, integrated therein. This also enables this part of the chip surface to be used.

A contact pad 4 for a wire 5 to connect piezoelectric resistor 3 and a possible evaluation circuit is positioned over second junction point 16. This arrangement has proven to be especially advantageous during the wire bonding process, when wire 5 is firmly pressed onto contact pad 4, because the forces that this produces in the area of second junction point 16 are absorbed by rigid diaphragm edge 2.

When pressure acts upon diaphragm 1, as indicated by arrow 6 in FIG. 1a, the central area of diaphragm 1 is deflected upward. First junction point 15, and thus also the left edge of component 10, is also pressed upward, while the right edge of component 10 is firmly connected to diaphragm edge 2 via second junction point 16. This produces a vertical deformation of component 10, resulting in a deformation of the vertically oriented thinnest area of the component structure. This is deformation area 17 having piezoelectric resistor 3. In this connection, it has proven to be advantageous to apply a tensile load to thinned section 12 of bellows-like structure 11 so that the stresses are optimally transferred to piezoelectric resistor 3. The pressure-dependent variation in the resistance of piezoelectric resistor 3 is detected as a measure of the compressive load on diaphragm 1.

FIG. 1b shows the behavior of component 10 under thermally induced stresses. If the expansion of silicon component 10 in the presence of temperature changes is different than that of the steel substrate, lateral mechanical stresses are produced, since silicon component 10 is unable to expand according to the temperature change because it is connected to the steel substrate. These lateral stresses are concentrated in the laterally oriented thinnest area of the component structure, namely in thinned section 12 of bellows-like structure 11. A deformation that reduces the lateral stresses occurs here. This prevents component 10 from bending in the vertical direction, which would result in a change in the resistance of piezoelectric resistor 3 without pressure acting upon diaphragm 1.

Component 10 illustrated in FIGS. 1a and 1b may be manufactured in a number of different ways. Notches 13 and 14 in bellows-like structure 11 and notch 18 in the area of deformation area 17 may be produced, for example, by sawing prior to separating the components. Another possibility is to use anisotropic etching techniques, such as plasma etching, high-speed trench etching or KOH etching, which allow a more accurate notch position and depth to be achieved. Predetermined breaking points, for example in the form of perforations, may be created for separating the component chips.

Figure 2:
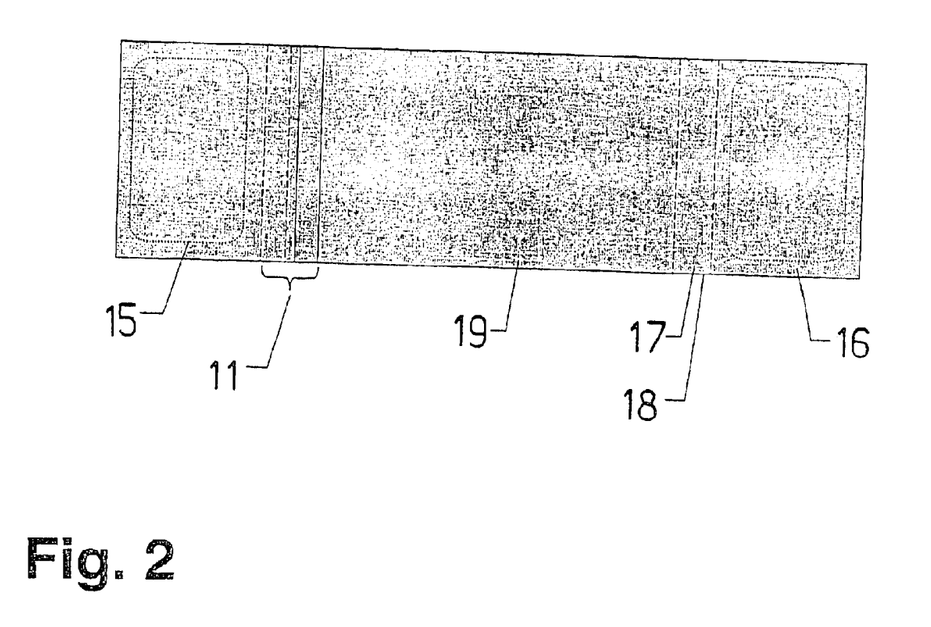
FIG. 2 shows the micromechanical component illustrated in FIGS. 1a and 1b, viewed from above.

FIG. 2 shows the layout of component 10 illustrated in FIGS. 1a and 1b, viewed from above. The illustration shows—from left to right—first junction point 15 for attaching component 10 in the central area of the steel diaphragm; bellows-like structure 11; reinforced central area 19, including space for parts of an evaluation circuit; deformation area 17, in which the piezoelectric resistors are locatable; and second junction point 16, having an area for contact pads, second junction point 16 being located over diaphragm edge 2.

It should be noted at this point that both the number and position of the resistors implemented on or in the component according to the present invention are variable. In an advantageous embodiment, two piezoelectric resistors are provided in the deformation area. In addition, two non-piezoelectric resistors are positioned as reference resistors next to the deformation area. The piezoelectric resistors and the reference resistors are easily connectable to a Wheatstone bridge. The vertical deformations of the component are also advantageously detectable by two piezoelectric resistors that are positioned perpendicular to each other in the deformation area. A further possibility is to provide, in the deformation area, two longitudinally oriented piezoelectric resistors as well as two non-piezoelectric reference resistors that are oriented at a 45-degree angle thereto.

Figures 3A, 3B:
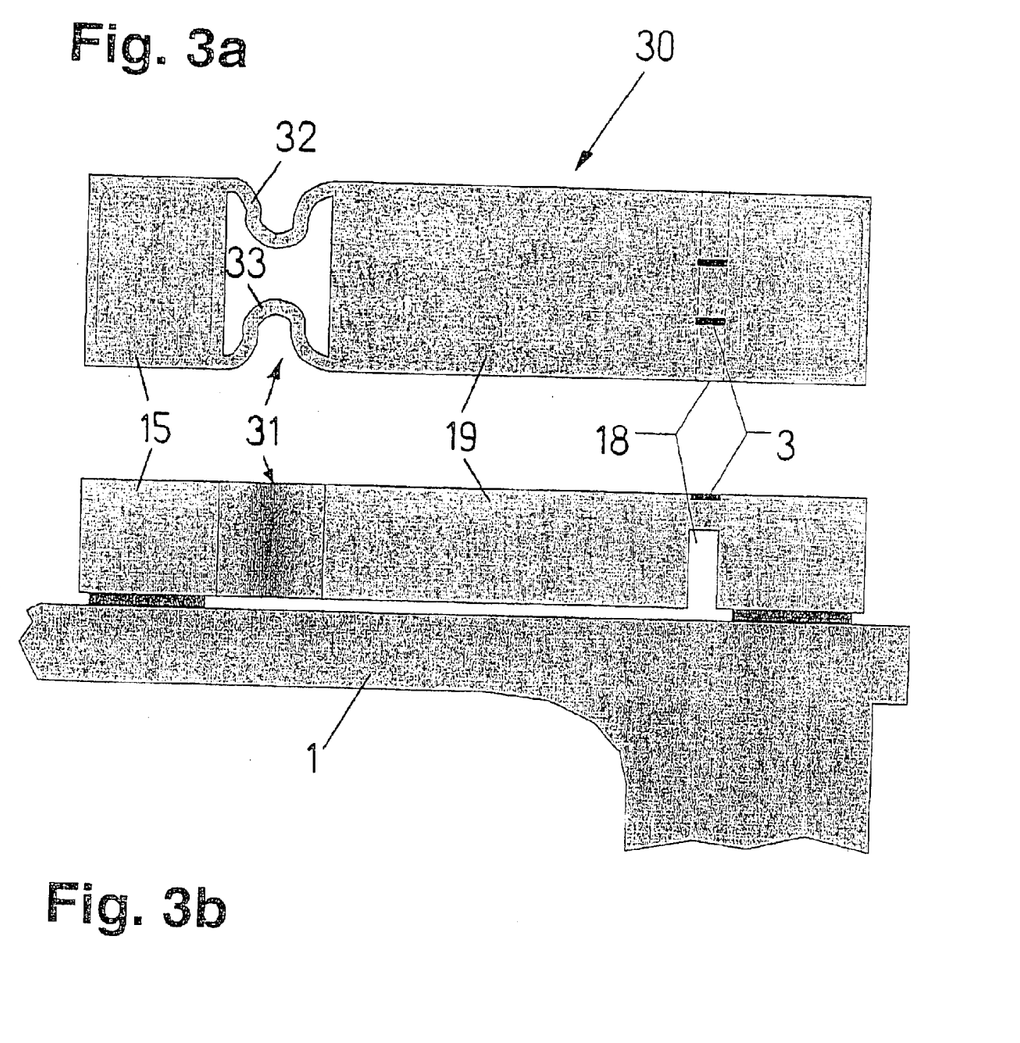

In the embodiment of a pressure sensor according to the present invention illustrated in FIGS. 3a and 3b, component 30 is also designed in the form of a bridge and, as illustrated in FIGS. 1a and 1b, mounted on diaphragm 1 and diaphragm edge 2, respectively. The main difference between component 30 illustrated in FIGS. 3a and 3b and component 10 illustrated in FIGS. 1a, 1b and 2 lies in the implementation of bellows-like structure 31. In this case, bellows-like structure 31 is implemented in the form of two undulated connecting webs 32 and 33 that connect first junction point 15 to reinforced central area 19. Undulated connecting webs 32 and 33 extend vertically, i.e., perpendicular to the two main surfaces of component 30, across the entire thickness of the component structure. This allows them to absorb lateral deformations, while vertical deformations of the component structure are transferred to deformation area 17, where, in the exemplary embodiment illustrated here, two piezoelectric resistors 3 are located to detect measured values.

Figure 4A:
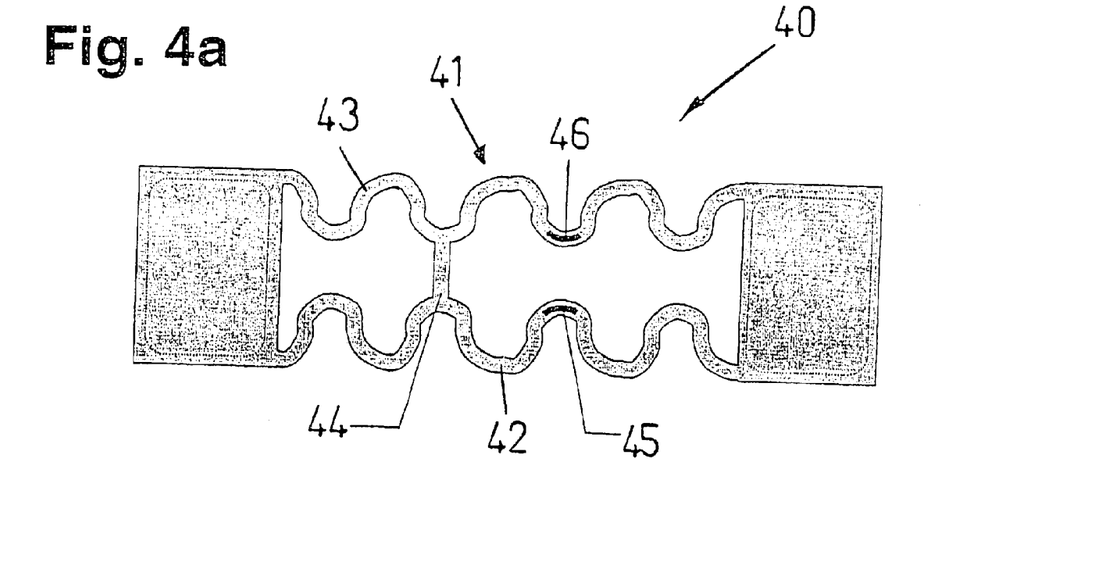
FIG. 4a shows a third example embodiment of a micromechanical component according to the present invention, viewed from above.

FIG. 4a shows a further embodiment of a component 40 according to the present invention in which bellows-like structure 41 is integrated into the deformation area. In this case, bellows-like structure 41 is implemented in the form of two undulated connecting webs 42 and 43, each having four loops, that connect first junction area 15 to second junction area 16. This component structure therefore does not have a reinforced central area, but is stabilized solely by an intermediate beam 44. In this case as well, undulated connecting webs 42 and 43 extend vertically across the entire thickness of the component structure. Piezoelectric resistors 45 and 46, which are positioned so that they undergo a change in resistance only in the presence of deformations perpendicular to the component structure, but not in the presence of lateral stresses in the component structure, are provided on thin connecting webs 42 and 43. This arrangement is described in greater detail below on the basis of FIGS. 4b and 4c.

Figure 4B:
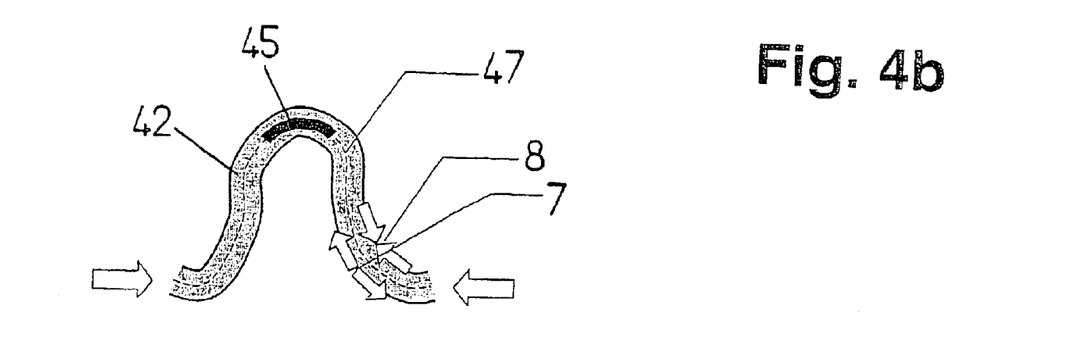
FIG. 4b shows part of the bellows-like structure of the micromechanical component illustrated in FIG. 4a, viewed from above during lateral compression.
Figure 4C:
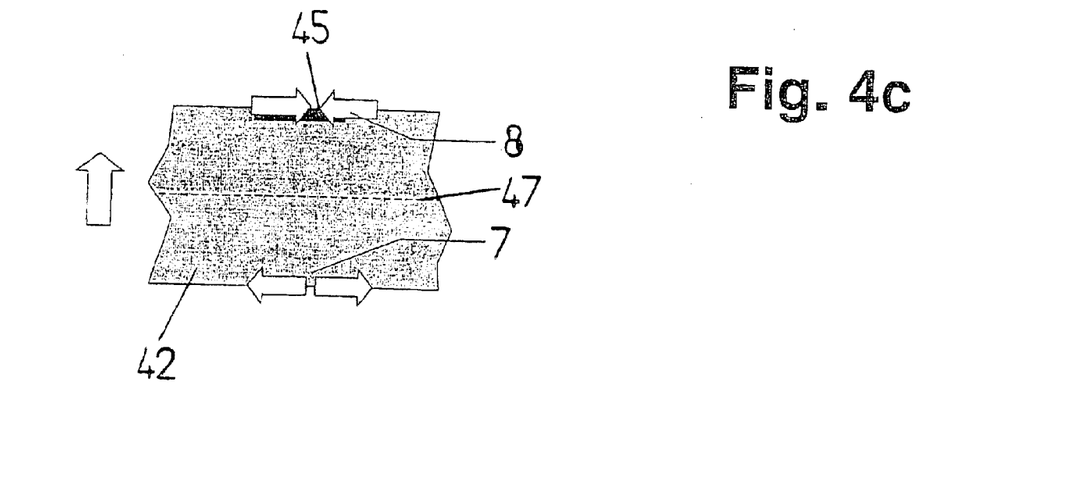
FIG. 4c shows a sectional view of part of the bellows-like structure of the micromechanical component illustrated in FIG. 4a under vertical deformation of the component.

Arrows 7 and 8 in FIG. 4b illustrate, based on the example of connecting web 42, the mechanical stresses that occur when component 40 undergoes a lateral deformation in bellows-like structure 41. When bellows-like structure 41 is compressed, a tensile load acts upon one side of connecting web 42—arrow 7—while a compressive load occurs on the other side—arrow 8. In the middle of connecting web 42 is an area that remains largely stress-neutral and is therefore referred to as neutral fiber 47. Piezoelectric resistor 45 is positioned here so that it does not undergo any change in resistance in the presence of a lateral deformation of the component structure. However, if component 40 is deformed perpendicular to the direction of movement of bellows-like structure 41, a tensile load occurs on the bottom of bellows-like structure 41, while a compressive load occurs on the top thereof, as again illustrated by arrows 7 and 8 in FIG. 4c. In this case, piezoelectric resistor 45 positioned on the top of connecting web 42 is located at the point of maximum stress and therefore also undergoes a change in resistance.

Figure 5:
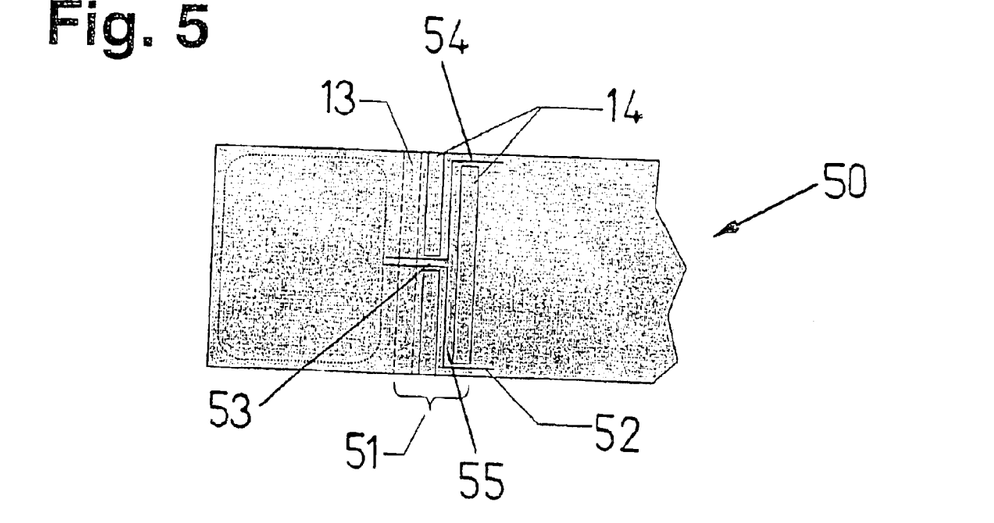
FIG. 5 shows a top view of the bellows-like structure of a fourth example embodiment of a component according to the present invention including printed conductors.
Figure 6A:
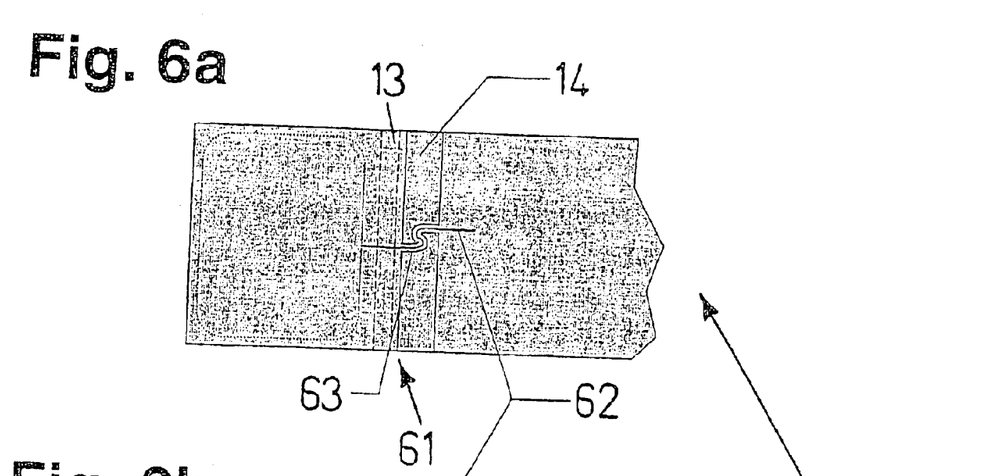
FIG. 6a shows a top view of the bellows-like structure of a fifth example embodiment of a component according to the present invention including printed conductors.
Figure 6B:
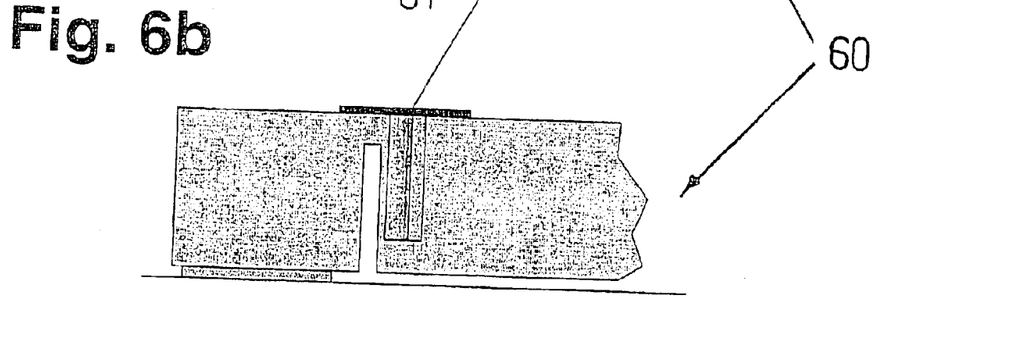

FIG. 5 and FIGS. 6a and 6b show two example ways to implement a bellows-like structure 51 and 61 in a component 50 and 60, respectively, according to the present invention, in the event that printed conductors 52 and 62, respectively, need to be routed over bellows-like structure 51 and 61, respectively. In both embodiments, bellows-like structure 51 and 61, respectively, is implemented by two notches 13 and 14 in the component structure, which extend away from the two diametrically opposed main surfaces of the component structure.

Bellows-like structure 51 illustrated in FIG. 5 includes a notch 13 that extends across the entire width of component 50 and begins at the bottom of the component structure. Parallel thereto is a first notch 14 that extends away from the top of the component structure and is interrupted in the middle, leaving a web 53 for routing printed conductors 52. This web 53 extends along the entire depth of first notch 14 and is oriented perpendicular to notches 13 and 14. A second notch 14 extending away from the top of the component structure is provided parallel to first notch 14. This second notch 14 does not extend across the entire width of component 50, leaving webs 54 in the two edge areas over which printed conductors 52 may be routed. In the exemplary embodiment illustrated in FIG. 5, two printed conductors 52 are routed from the left area of the component surface over notch 13 and over web 53 bridging first notch 14 on web 55 remaining between first and second notches 14. On this web 55, the printed conductors are then routed between both notches 14 to the outside and via webs 54 to reinforced central area 19 of component 50.

Bellows-like structure 61 illustrated in FIGS. 6a and 6b also includes a notch 13 that extends across the entire width of component 60 and begins at the bottom of the component structure. In contrast to the example embodiment illustrated in FIG. 5, only one notch 14 extending away from the top of the component structure is positioned parallel to notch 13. In this case as well, bellows-like structure 61 has a web 63 for routing printed conductors 62. This web 62 has an undulated design, is positioned in the central area of notch 14 and extends along the entire depth of notch 14. In the exemplary embodiment illustrated in FIGS. 6a and 6b, a printed conductor 62 is routed from the left area of the component surface over notch 13 and over undulated web 63 bridging notch 14 to reinforced central area 19 of component 60.

Figure 7:
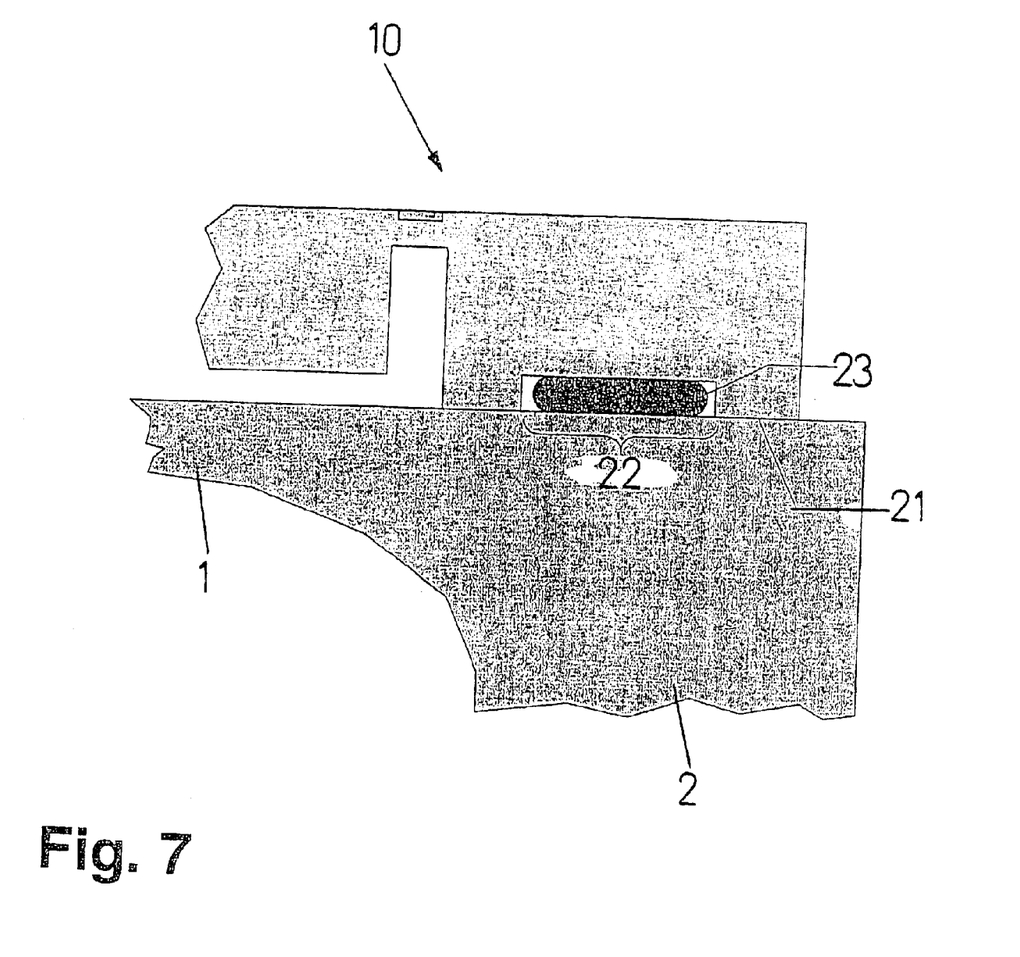
FIG. 7 shows a sectional view of the junction point of a component according to the present invention in the diaphragm edge area.

FIG. 7 shows an advantageous way to implement second junction area 16 of a component 10 according to the present invention on diaphragm edge 2 of a pressure sensor. In this case, spacers 21 are provided in junction area 16 on the bottom of component 10. These spacers 21 may be produced, for example, by etching techniques or by a wide, flat sawing cut. Connecting material 23, for example, solder, is provided in this case in notch 22 between spacers 21.

Resistors, feed lines and contact pads may also be recessed. This has proven to be especially advantageous when mounting the component according to the present invention, since the component is able to be pressed onto the carrier across the entire surface without scratches or pressure marks damaging sensitive areas.

To increase the distance between the component and the diaphragm, the diaphragm may be provided with a groove that is positioned centro-symmetrically to the central supporting point of the component.

It should also be noted in connection with the exemplary embodiments described above that the component according to the present invention may have not only an asymmetrical design, as described, but also a symmetrical one, for example having a centrally located supporting point and bellows-like structures positioned to the left and right thereof. For example, it may also have a round shape, including a round bellows-like structure, and a round notch for concentrating the mechanical stresses at the location of the piezoelectric resistors.

The primary advantages of the component according to the present invention and the pressure sensor according to the present invention are summarized below:

The example component according to the present invention is able to efficiently absorb parasitic, thermally induced, mechanical stresses in the pressure sensor according to the present invention. At the same time, it efficiently transfers mechanical stresses that are caused by compressive loads on the sensor diaphragm.

The construction techniques needed to produce the pressure sensor according to the present invention as well as the necessary connecting techniques are simple. A high chip yield may be expected in manufacturing the components. In addition, the surface of the sensor diaphragm need not meet strict standards. On the whole, this makes the pressure sensor according to the present invention very economical to produce.

Despite the compact size of the component according to the present invention, an evaluation circuit is integratable.

What is claimed is:

1. A pressure sensor, comprising:
    a micromechanical component including at least one bellows-like structure in which lateral deformations of the micromechanical components are concentrated, the lateral deformations being parallel to two main surfaces of the micromechanical component; and
    at least one diaphragm, the micromechanical component being at least partially located on the diaphragm, the micromechanical component including means for detecting deformations of the micromechanical component that are caused by deflections of the diaphragm.

2. The pressure sensor as recited in claim 1, wherein the micromechanical component includes at least one deformation area that is thinner than other parts of the micromechanical component so that vertical deformations of the component are concentrated in the deformation area, the vertical deformations being deformations perpendicular to the two main surfaces of the micromechanical component.

3. The pressure sensor as recited in claim 2, wherein the deformation area is configured in a form of a web that is oriented parallel to the two main surfaces of the micromechanical component.

4. The pressure sensor recited in claim 2, wherein the deformation area is integrated into the bellows-like structure.

5. The pressure sensor as recited in claim 4, wherein the bellows-like structure includes at least one undulated web that extends across an entire thickness of the micromechanical component and interconnects two areas of the component, and wherein the deformation area is formed by a central area of the undulated web, which acts neutrally toward lateral deformations of the component, and represents a point of maximum stress in a case of vertical deformations of the micromechanical component.

6. The pressure sensor as recited in claim 2, wherein the means for detecting the deformations includes at least one of a piezoelectric resistor, a metallic resistor or wire resistance strain gauge, located in the deformation area.

7. The pressure sensor as recited in claim 6, wherein the at least one of the piezoelectric resistor, a metallic resistor or wire resistance gauge is connected to at least one reference resistor in a Wheatstone bridge.

8. A The pressure sensor as recited in claim 1, wherein the micromechanical component includes at least one part of an evaluation circuit in a reinforced area of the component.

9. The pressure sensor as recited in claim 2, wherein the micromechanical component is implemented in a form of a bridge, and the micromechanical component is mounted on the diaphragm via a first junction point in a central area of the diaphragm and via a second junction point in an area of an edge of the diaphragm, so that the bellows-like structure and the deformation area are located between the first junction point and the second junction point.

10. The pressure sensor as recited in claim 9, wherein the bellows-like structure is located in the area of the diaphragm, the deformation area is located in a vicinity of the second junction point, and a reinforced central area is provided between the bellows-like structure and the deformation area.

11. The pressure sensor as recited in claim 10, wherein at least one part of an evaluation circuit is located in the reinforced central area.

12. The pressure sensor as recited in claim 9, wherein at least one contact pad is provided over the second junction point.

13. The pressure sensor as recited in claim 1, wherein the micromechanical component has two parallel notches, and wherein the bellows-like structure includes at least one thinned section that extends across an entire thickness of the micromechanical component and is located between the two parallel notches in the micromechanical component, one of the notches extending away from one main surface of the micromechanical component and the other of the notches extending away from another main surface of the micromechanical component so that lateral deformations of the micromechanical component result in a deformation of the thinned section.

14. The pressure sensor as recited in claim 1, wherein the bellows-like structure includes at least one undulated web that extends across an entire thickness of the micromechanical component and interconnects two areas of the micromechanical component.

15. The pressure sensor as recited in claim 1, wherein the micromechanical component is formed from silicon.

16. The pressure sensor as recited in claim 15, wherein the bellows-like structure is produced by one of sawing or anisotropic etching.

17. The pressure sensor as recited in claim 15, wherein the bellows-like structure is produced by one of plasma etching, trench etching or KOH etching.

* * * * *